United States Patent
McFadden

(10) Patent No.: US 8,433,198 B2
(45) Date of Patent: Apr. 30, 2013

(54) METHODS AND APPARATUSES FOR ENABLING DETECTION OF A MODULATED OPTICAL SOURCE

(75) Inventor: Michael J. McFadden, San Antonio, TX (US)

(73) Assignee: The Aerospace Corporation, El Segundo, CA (US)

( * ) Notice: Subject to any disclaimer, the term of this patent is extended or adjusted under 35 U.S.C. 154(b) by 611 days.

(21) Appl. No.: 12/628,129

(22) Filed: Nov. 30, 2009

(65) Prior Publication Data

US 2011/0129228 A1     Jun. 2, 2011

(51) Int. Cl.
*H04B 10/00* (2006.01)
(52) U.S. Cl.
USPC ........................ 398/118; 398/107; 398/129
(58) Field of Classification Search .......... 398/106–114, 398/118–131
See application file for complete search history.

(56) References Cited

U.S. PATENT DOCUMENTS

| | | | |
|---|---|---|---|
| 5,299,227 A * | 3/1994 | Rose | 342/45 |
| 5,686,722 A * | 11/1997 | Dubois et al. | 250/226 |
| 6,879,263 B2 | 4/2005 | Pederson et al. | |
| 7,308,202 B2 * | 12/2007 | Roes et al. | 398/108 |
| 2006/0243909 A1 * | 11/2006 | Cerwin et al. | 250/336.1 |
| 2009/0288474 A1 * | 11/2009 | Kalkman et al. | 73/24.02 |
| 2010/0202047 A1 * | 8/2010 | Maximus et al. | 359/464 |

OTHER PUBLICATIONS

"Illuminate & Communicate: Boston University Partners in NSF Challenge to Create Next Generation Wireless Network Using Visible Light," Oct. 6, 2008, Boston University Colleage of Enginerring, Boston, MA.

* cited by examiner

*Primary Examiner* — Dzung Tran
(74) *Attorney, Agent, or Firm* — Henricks, Slavin & Holmes LLP

(57) ABSTRACT

Methods and apparatuses for enabling detection of a modulated optical source involve one or more modulated optical signals shifted, i.e., demodulated optically, to one or more base band signals that are detectable by one or more low-frequency detectors.

103 Claims, 9 Drawing Sheets

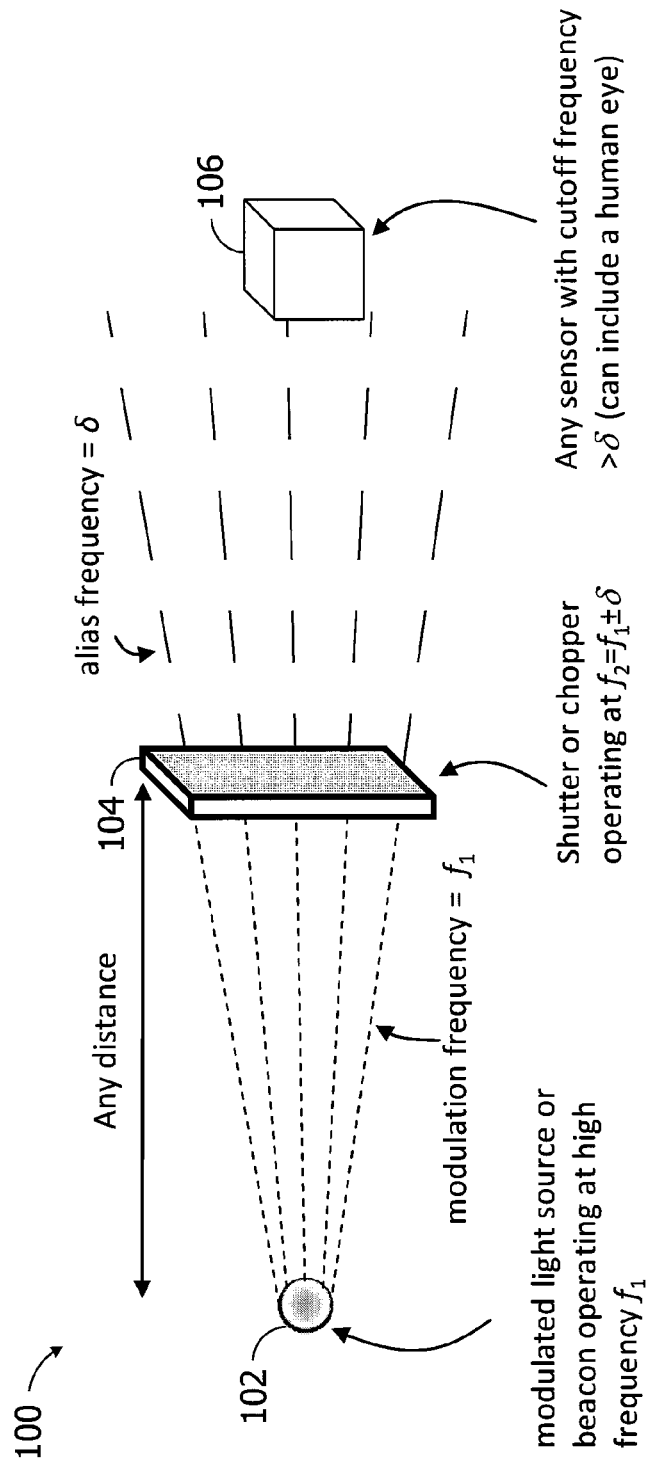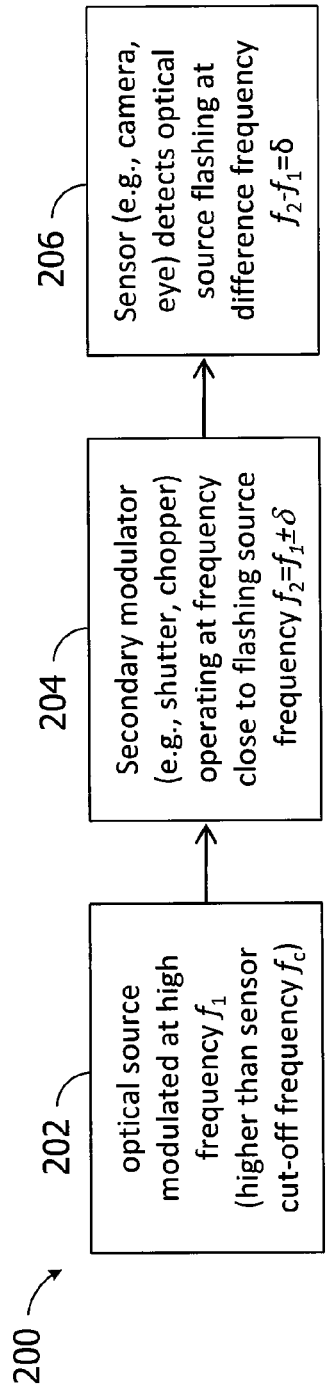
FIG. 1
FIG. 2

METHODS AND APPARATUSES FOR ENABLING DETECTION OF A MODULATED OPTICAL SOURCE

TECHNICAL FIELD

The invention relates generally to signal detection and, in particular, to methods and apparatuses for enabling detection of modulated optical signals by low-frequency detectors.

BACKGROUND ART

Free space optical communications is a line-of-sight (LOS) technology that transmits a modulated beam of visible or infrared light through the atmosphere for broadband communications. In a manner similar to fiber optical communications, free space optical communication uses a modulated light emitting diode (LED), laser (light amplification by stimulated emission of radiation), or other light source for data transmission.

Various known beacon systems utilize modulated optical signals in conjunction with broadband high-speed detector devices. In these systems, the modulated optical signals are typically demodulated in electronics which include, for example, a mixer and a low-pass filter.

It would be useful to be able to provide a beacon system that utilizes modulated optical signals without requiring broadband or high-speed detector devices, or demodulation electronics. It would also be useful to be able to provide a silent alarm, indicator, beacon or the like that is visible only to select (i.e., enabled) viewers, sensors and/or detectors. It would also be useful to be able to be able to selectively enable the content that is viewable by particular viewers, sensors and/or detectors. It would also be useful to be able to provide an enhanced viewing experience in which select viewers of an image or sequence of images are provided with a mechanism that permits them to view supplemental image content that is not detectable by other viewers.

SUMMARY OF THE INVENTION

Embodiments of the present invention pertain to shifting a high-speed modulated optical signal in temporal frequency so that it can be detected by a low-frequency sensor/detector. According to the example methods and apparatuses described herein, the modulated optical signal is demodulated optically by a secondary modulator (or secondary modulation device) that shifts the signal to a lower-frequency band, which enables detection of the signal by a low-frequency detector. In an example embodiment, the modulated optical signal is shifted to a base band signal that can be detected by low-frequency detectors such as the human eye or a low frame-rate video camera.

In an example embodiment, the secondary modulation device shifts a temporally modulated optical signal. Any color of light can be used, and at any temporal frequency, as long as the detector can see that light and the secondary modulation device can operate near the modulation rate of the beacon (or other source of the modulated optical signal). In other embodiments, an amplitude or polarization modulated optical signal is shifted by the secondary modulation device.

In an example embodiment, the secondary modulation device is an optical shutter (e.g., a chopper wheel, a liquid crystal spatial light modulator, or other shuttering device), and the shifting of the modulated optical signal does not rely upon a high-speed detector or wideband detector.

Methods and apparatuses for the simplified identification of a flashing beacon that would appear to all but the fastest frame-rate cameras to be a non-flashing light source utilize an optical shutter that opens and closes at a frequency close to that of an optical beacon having a "high" oscillation frequency. The "high" frequency of the flashing beacon may simply be a rate that is higher than can be detected by the human eye (>35 Hz), or it may be so high that its flashing would go undetected by all but the very fastest frame-rate cameras (>500 Hz). The effect of oscillating the optical shutter between the beacon and the detector is to create a favorable aliasing situation so that the beacon can easily be observed by a low-frequency detector. When the shutter frequency is close to the beacon frequency, the alias frequency of the beacon as observed through the shutter is the difference of the frequency of the beacon and that of the shutter. Therefore, a flashing beacon that appears to be a constant light source to all but the very fastest of fast frame-rate cameras can be easily identified utilizing the methods and apparatuses described herein.

In an example embodiment, a method for enabling detection of a modulated optical source includes: shifting one or more modulated optical signals to one or more base band signals that are detectable by one or more low-frequency detectors.

In an example embodiment, a method for enabling detection of a modulated optical source includes: providing one or more devices that are configured to generate one or more modulated optical signals; controlling the one or more devices to generate the one or more modulated optical signals; and shifting the one or more modulated optical signals to one or more base band signals that are detectable by one or more low-frequency detectors.

In an example embodiment, an apparatus for enabling detection of a modulated optical source includes: one or more optical demodulators configured to shift one or more modulated optical signals to one or more base band signals that are detectable by one or more low-frequency detectors. In an example embodiment, the apparatus further includes: one or more devices configured to generate the one or more modulated optical signals and/or one or more low-frequency detectors.

Example implementations of the modulated optical source detection enablement techniques described herein pertain to: providing a silent alarm, indicator, beacon or the like that is visible only to select (i.e., enabled) viewers, sensors and/or detectors; selectively enabling the content that is viewable by particular viewers, sensors and/or detectors; and providing an enhanced viewing experience in which select viewers of an image or sequence of images are provided with a mechanism that permits them to view supplemental image content that is not detectable by other viewers.

BRIEF DESCRIPTION OF THE DRAWINGS

FIG. 1 illustrates an example apparatus for enabling detection of a modulated optical source;

FIG. 2 illustrates an example method for enabling detection of a modulated optical source;

DISCLOSURE OF INVENTION

Figure 3A:
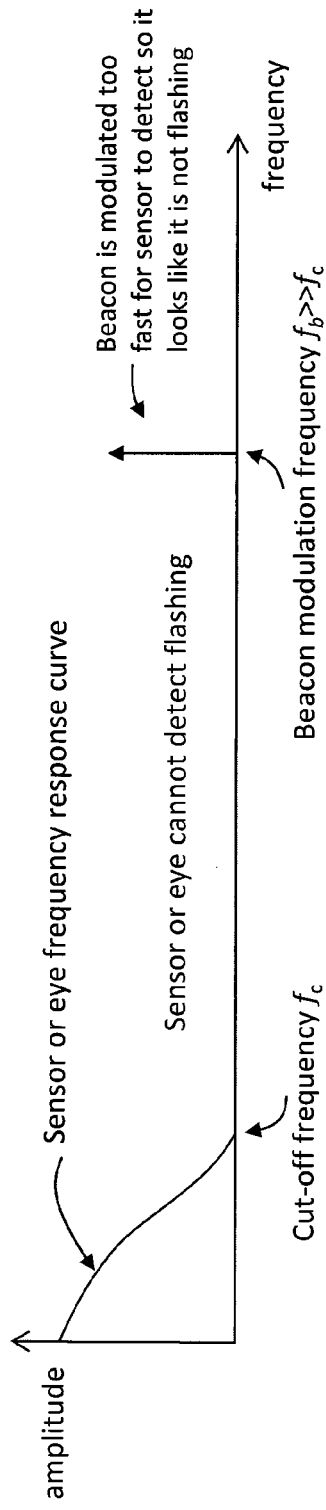
FIG. 3A illustrates an example frequency response of a low-frequency detector viewing a high-frequency modulated optical signal directly.

Referring to FIG. 1, an example apparatus 100 for enabling detection of a modulated optical source includes a modulated light source or beacon 102 operating at high frequency $f_1$, a shutter or chopper 104 operating at $f_2=f_1\pm\delta$, and a sensor or other detector 106 with cutoff frequency $>\delta$ (alias frequency=$\delta$), configured as shown.

In an example embodiment, the modulated optical shutter 104 is controlled such that it opens and closes at a rate within the approximate frequency range of the flashing source 102, which is viewed through the modulated optical shutter 104 by the detector 106. In other words, the light source 102 is viewed through the shutter 104 (a secondary modulator) that modulates at a frequency near the operating frequency of the light source 102. This deliberately creates a sampling artifact known as "aliasing" to enable detection of a low-frequency aliased signal.

The flashing source 102 and the shutter 104 work together in a "lock-and-key" fashion. In an example embodiment, the source 102 is a high-frequency modulated light source (high frequency is relative to the cut-off frequency of the detector 106—e.g., human vision cutoff is approximately 25 Hz) which is configured and controlled to flash at a rate that is significantly greater than the frame rate of the detector 106. In such an example embodiment, where a high-frequency modulated light source is employed, the flash rate of the source 102, or the fact that it is even flashing, cannot be easily determined without the shutter 104, but with the shutter 104 it becomes instantly apparent. It should be appreciated, however, that the principles described herein are also applicable to detectors capable of operating at a higher frame rate and/or that include other signal detection capabilities.

Referring to FIG. 2, an example method 200 for enabling detection of a modulated optical source includes, at 202, modulating an optical source at high frequency $f_1$ (higher than sensor cut-off frequency $f_c$). The modulated optical signal is directed at the secondary modulator (e.g., shutter, chopper) which, at 204, operates at a frequency $f_2=f_1\pm\delta$, which is close to the flashing source frequency $f_1$. The secondary modulator shifts the modulated optical signal, and directs the resulting shifted signal to the sensor (e.g., camera) which, at 206, detects the optical source flashing at the difference frequency $f_2-f_1=\delta$.

In an example embodiment, the optical shutter operates in tandem with the optical beacon, which flashes at a defined or controlled frequency. The optical shutter creates a favorable aliasing situation so that a low-frequency detector such as the human eye or a low frame-rate camera can detect the fact that a seemingly constant light source is in fact blinking at a high rate. If the optical beacon were flashing at 1000 Hz, for example, it would be impossible to detect the fact that it was flashing a low-frequency detector, but by viewing the optical beacon through an optical shutter flashing at 999 Hz, for example, a low-frequency detector is capable of detecting that the beacon is flashing, as it would appear to turn off and on once per second.

FIG. 3A illustrates an example frequency response of a low-frequency detector viewing a high-frequency modulated optical signal directly (i.e., the beacon is modulated too fast for the sensor to detect and, therefore, appears as if it is not flashing).

Figure 3B:
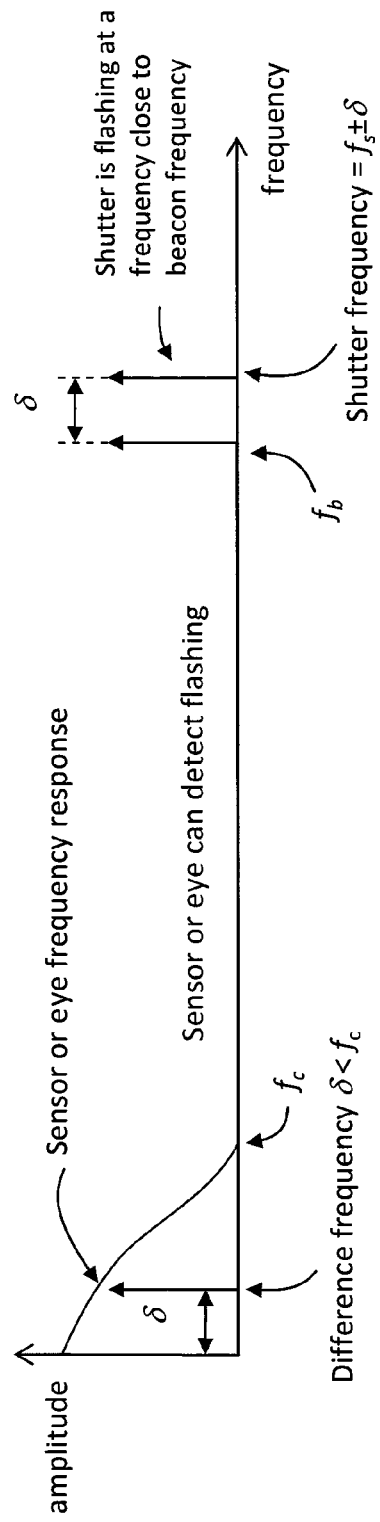
FIG. 3B illustrates an example frequency response of a low-frequency detector viewing a high-frequency modulated optical signal through an optical shutter according to the present invention.

FIG. 3B illustrates an example frequency response of a low-frequency detector viewing a high-frequency modulated optical signal through an optical shutter according to the present invention (i.e., the shutter is flashing at a frequency $f_s\pm\delta$ close to the beacon frequency $f_b$, which enables the low-frequency detector to detect the flashing of the beacon).

The present invention contemplates methods, apparatuses, and systems involving any number of modulated optical signals, optical shutters, and/or detectors. Thus, in an example embodiment, a method for enabling detection of a modulated optical source includes: shifting one or more modulated optical signals to one or more base band signals that are detectable by one or more low-frequency detectors. In an example embodiment, shifting at least one of the one or more modulated optical signals to one or more base band signals includes creating one or more sampling artifacts. In an example embodiment, shifting at least one of the one or more modulated optical signals to one or more base band signals includes generating one or more aliased signals. In an example embodiment, the shifting of the one or more modulated optical signals to one or more base band signals does not include using a mixer or a low-pass filter to demodulate the one or more modulated optical signals.

In another example embodiment, an apparatus for enabling detection of a modulated optical source includes: one or more optical demodulators configured to shift one or more modulated optical signals to one or more base band signals that are detectable by one or more low-frequency detectors. In an example embodiment, the apparatus further includes: one or more devices configured to generate the one or more modulated optical signals and/or one or more low-frequency detectors.

Figure 4:
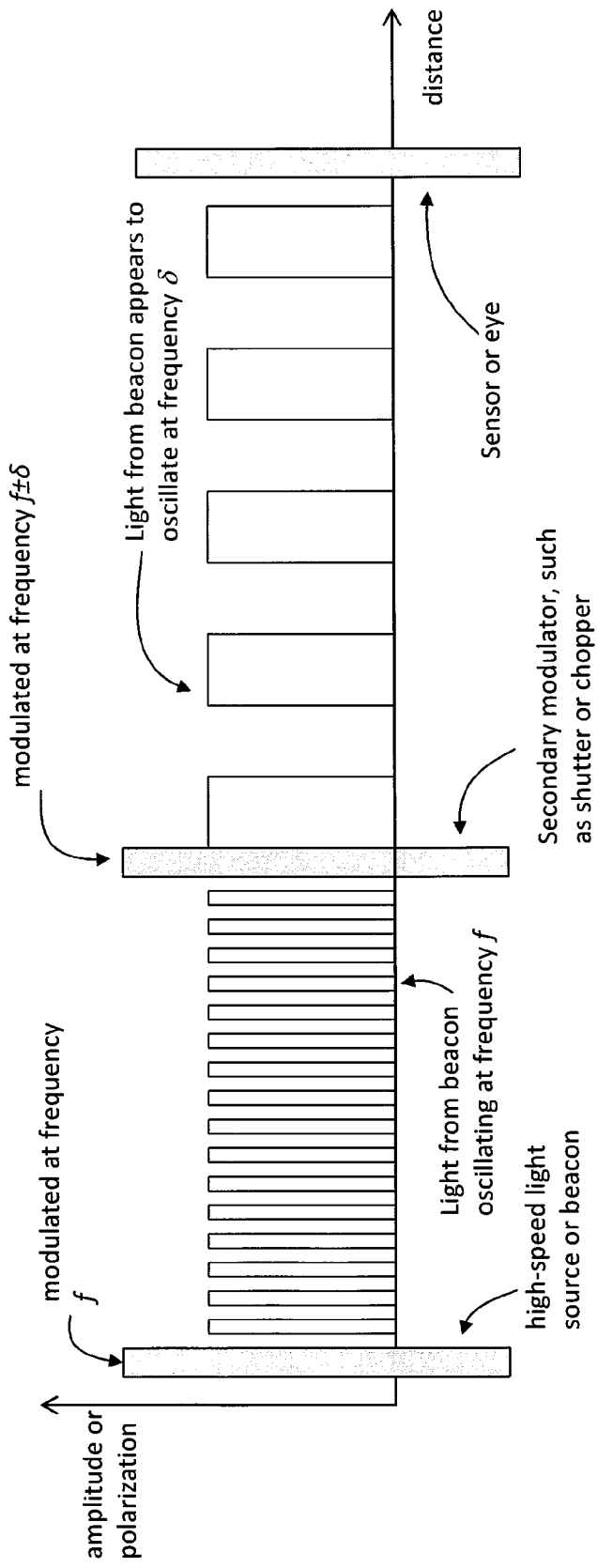
FIG. 4 illustrates alternative implementations utilizing amplitude or polarization modulated optical signals.

In an example embodiment, at least one of the one or more devices is configured to generate a frequency modulated optical signal. Referring to FIG. 4, in alternative implementations of modulated optical signal detection, at least one or more devices is configured to generate an amplitude modulated optical signal and/or a polarization modulated optical signal. By way of example, the optical signal can be amplitude modulated employing a mechanical shutter, liquid crystal shutter, chopper wheel, or rotating polarizer (if the amplitude modulated light source is polarized). By way of example, the optical signal can be polarization modulated using a polarization rotator and an analyzer, or a rotating polarizer.

In an example method for enabling detection of a modulated optical source, shifting at least one of the one or more modulated optical signals to one or more base band signals includes viewing at least one of the one or more modulated optical signals through one or more secondary modulators. In an example embodiment, at least one of the one or more modulated optical signals is modulated at a modulation frequency, and at least one of the one or more secondary modulators modulates at a secondary modulation frequency near the modulation frequency. In an example embodiment, at least one of the one or more secondary modulators includes:

an optical shutter (e.g., a mechanical shutter or an electro-optical shutter). The optical shutter can be mechanical, as in the case of a chopper wheel, or it may be electro-optical, as in the case of liquid crystal shutters, electro-chromic glass, or photo-chromic glass. The optical shutter can be a polarization rotating liquid crystal reflection-mode spatial light modulator, or a non-polarizing transmission mode polymer-stabilized cholesteric textured (PSCT) liquid crystal fast optical shutter (FOS). The PSCT FOS is a low-profile solution with no mechanical moving parts, and it can be operated with simple electronics powered by an ordinary battery.

In another example embodiment, at least one of the one or more secondary modulators is provided as a component of a pair of eye glasses, an eyepiece (e.g., monocle), a scope, or other device used in conjunction with the human eye or with some other low-frequency detector.

Figure 5:
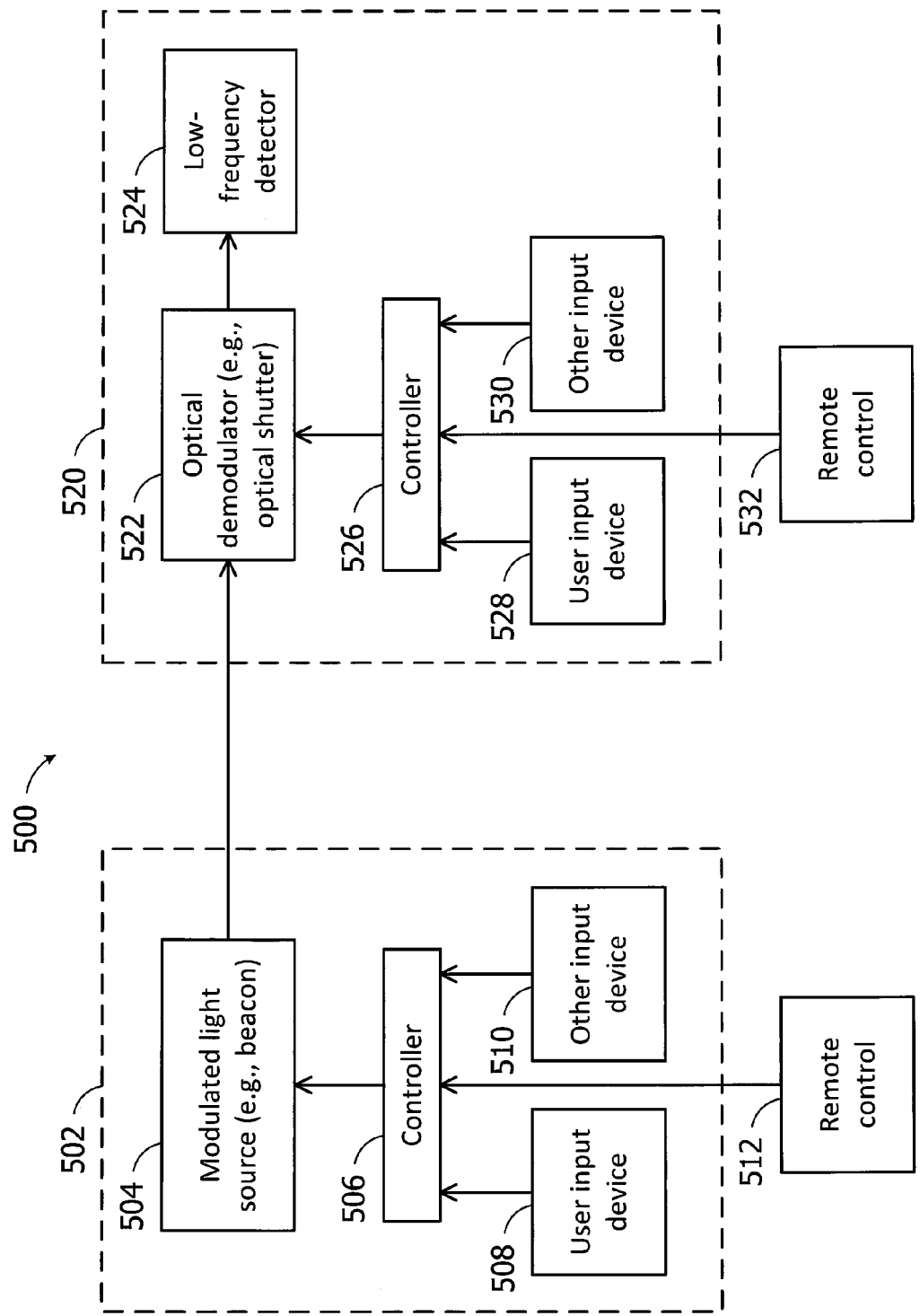
FIG. 5 illustrates an example embodiment of a system for enabling detection of a modulated optical source.

Referring to FIG. 5, an example system 500 for enabling detection of a modulated optical source includes a device 502 (that includes a modulated light source 504) and an enhanced low-frequency detector 520 (that includes an optical demodulator 522 and a low-frequency detector 524). In this example embodiment, the device 502 also includes a controller 506, a user input device 508 (e.g., button, switch, etc.), and other input device 510 (e.g., a sensor or other device providing one or more inputs pertaining to a condition, status, or triggering event). In this example embodiment, the enhanced low-frequency detector 520 also includes a controller 526, a user input device 528 (e.g., button, switch, etc.), and other input device 530 (e.g., a sensor or other device providing one or more inputs pertaining to a condition, status, or triggering event). Thus, in an example embodiment, at least one of the one or more devices is controlled to generate a modulated optical signal in response to an input pertaining to a condition, status, or triggering event.

The system 500 can also include remote controls 512 and 532 for providing additional control or other inputs to the controllers 506 and 526, respectively (for example, via RF or other wireless communication links). In another embodiment, the modulated light source 504 is remotely located with respect to the device 502 (and, for example, a wireless communication link is provided between the modulated light source 504 and the device 502). Such an implementation may be desirable in circumstances where a clear LOS is not available between the device and the low-frequency detector.

In an example embodiment, the enhanced low-frequency detector 520 is configured such that the shutter can be swept through a range of frequencies. For example, the controller 526 is configured to facilitate "tuning" of the optical shutter. Thus, in such an embodiment, it is not necessary that the blink rate of the beacon be known. It is also not necessary that the "beacon" be an effective point source—it can be an extended source as well. Similarly, in various embodiments as discussed below, the controller 506 is configured to vary the modulation frequency of the modulated optical signal generated by the modulated light source 504.

The device 502 (or devices) can be almost anything including but not limited to: safety lights (e.g., runway lights), alarms (e.g., silent alarms), indicators, beacons, personal electronic devices (e.g., mobile telephones), wearing apparel (e.g., shirts, coats, hats), image presentation devices (e.g., monitors, displays, screens), and toys or other novelty items (such as decoder rings).

As previously discussed, various embodiments of systems and apparatuses for enabling detection of a modulated optical source include one or more devices 502. For example, at least one of the one or more devices includes a light source, e.g., a light emitting diode (LED), which is controlled to generate at least one of the one or more modulated optical signals. In an example embodiment, at least one of the one or more devices is a safety light. In an example embodiment, at least one of the one or more devices is a runway safety light. In an example embodiment, at least one of the one or more devices is a personal electronic device. In an example embodiment, at least one of the one or more devices is a silent alarm.

Also as previously discussed, various embodiments of systems and apparatuses for enabling detection of a modulated optical source include one or more low-frequency detectors 524. In an example embodiment, at least one of the one or more low-frequency detectors is the human eye. In an example embodiment, at least one of the one or more low-frequency detectors is a camera. In an example embodiment, at least one of the one or more low-frequency detectors has a cut-off frequency of approximately 25 Hz. In an example embodiment, at least one of the one or more low-frequency detectors has a cut-off frequency of approximately 40 Hz.

The methods and apparatuses for the identification of high flash-rate light sources described herein allowing an easily recognizable tag to be placed "out in the open" and go undetected except by an enabled sensor or other detector. In this manner, a tag, which if visible for what it is would be profoundly conspicuous, can be "hidden" in plain sight. Some example implementations and applications of systems, apparatuses and methods for enabling detection of a modulated optical source are now discussed.

Figure 6:
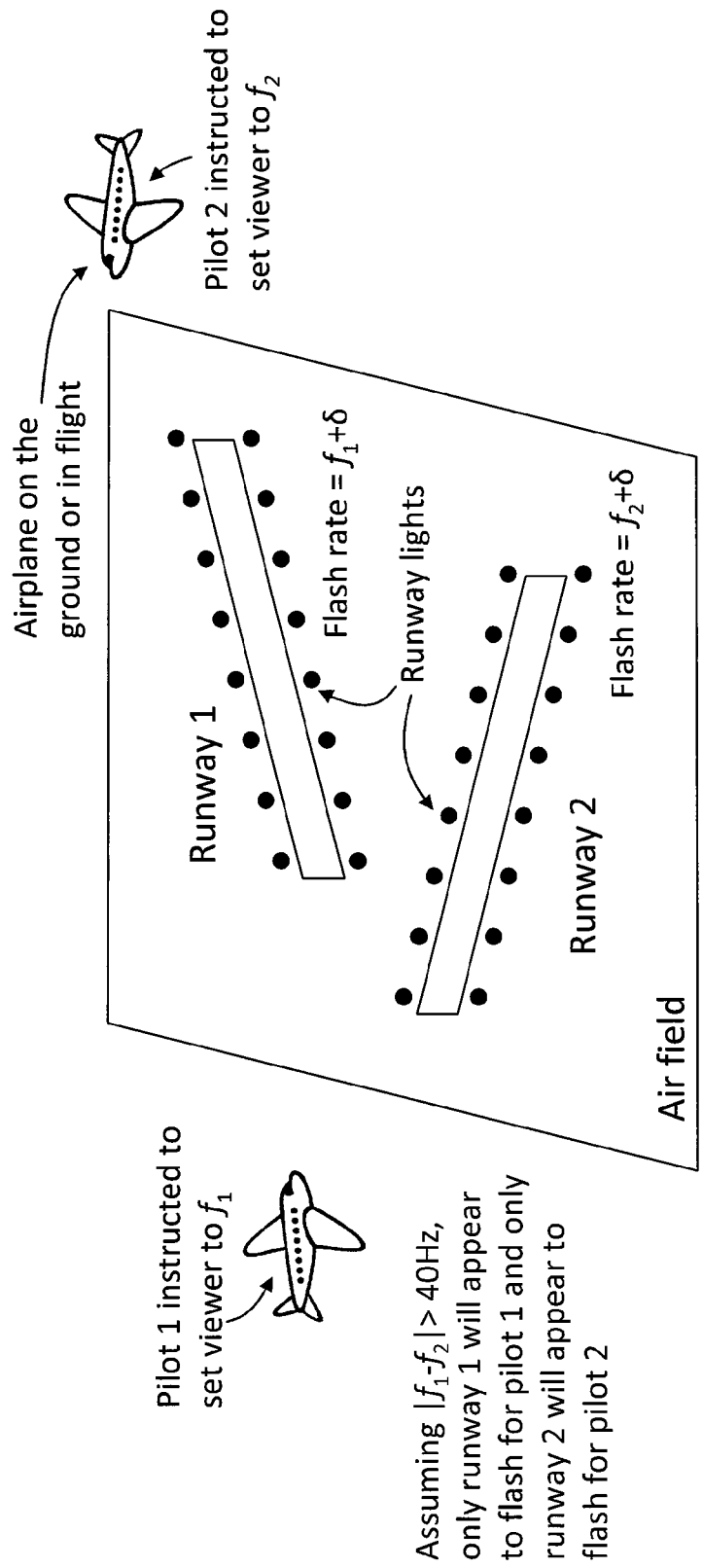
FIG. 6 illustrates an example implementation of modulated optical source detection pertaining to safety lights.

FIG. 6 illustrates an example implementation of modulated optical source detection pertaining to safety lights. In an example embodiment, multiple detectors are enabled to view a select group (or subset) of modulated optical signals, among multiple groups of modulated optical signals. For example, different groups of modulated optical signals (e.g., generated by runway safety lights) can be controlled to operate at different flash rates, and different pilots are enabled to view different groups of modulated optical signals. The interests of aviation safety are furthered by technology that serves to guide a pilot to the correct runway for takeoff or landing. Each runway could use a different modulation frequency "channel," separated by at least the bandwidth of the human eye (~30 Hz), which the pilot could tune in to. The air traffic controller could provide the pilot with the "station" that the correct runway is on, e.g., 450 Hz, and the pilot could "tune in" to it by tuning his/her shutter to 445 Hz, for example. The result would be that the only flashing runway lights the pilot would see would be on the correct runway, eliminating likelihood of a situation where the pilot takes off or lands on the incorrect runway. "Runway Incursion," resulting from confusion about runways, is a leading cause of accidents in commercial aviation. Furthermore, it is a growing cause of accidents, as incidents of runway incursion have risen 70% since 1993.

In an example embodiment, the one or more modulated optical signals includes two or more modulated signals modulated at a modulation frequency and shifted using a secondary modulation frequency such that only a subset of the two or more modulated optical signals is detectable by at least one of the one or more low-frequency detectors. In an example embodiment, the one or more low-frequency detectors include two or more low-frequency detectors each provided with an optical shutter device (or optical demodulator) through which the one or more modulated optical signals is viewed, and at least one of the one or more modulated optical signals is not detectable by at least one of the two or more low-frequency detectors. In an example embodiment, the one or more low-frequency detectors include two or more low-frequency detectors each provided with an optical shutter device (or optical demodulator) through which the one or more modulated optical signals is viewed, and the one or more modulated optical signals include two or more modulated optical signals modulated and shifted such that at least one of the two or more modulated optical signals is not detectable by at least one of the two or more low-frequency detectors.

Figure 7:
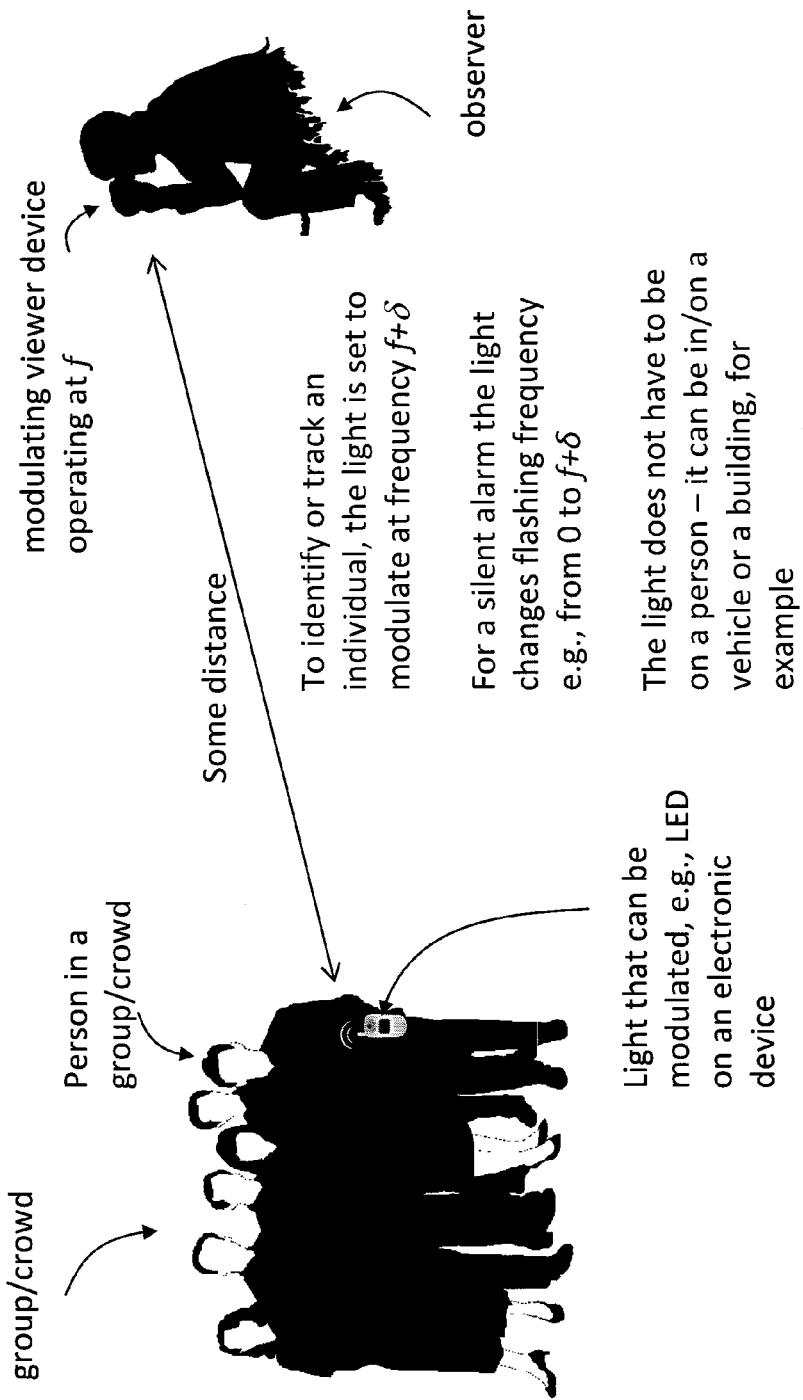
FIG. 7 illustrates an example implementation of modulated optical source detection pertaining to a silent alarm/indicator/beacon.

FIG. 7 illustrates an example implementation of modulated optical source detection pertaining to a silent alarm/indicator/beacon. In an example embodiment, one or more detectors are enabled to view a modulated optical signal that is generated by a device such as an alarm, indicator, beacon, or the like. By way of example, in response to an input pertaining to a condition, status, or triggering event, the device generates a modulated optical signal that is not visible to the unaided eye, but visible when viewed through a modulating viewer device operating at f. In one example embodiment, the light is set to modulate at a frequency $f+\delta$ and can be used to identify or track an individual. In another example embodiment, the light has a flashing frequency that changes (e.g., from 0 to $f+\delta$) and can serve as a silent alarm. As discussed below, the source of the modulated optical signal does not have to on a person; alternatively or additionally, the signal source can be in or on a building or vehicle, for example. It should be appreciated that the devices described herein can also be provided to animals.

In an example embodiment, a method for enabling detection of a modulated optical source includes: providing one or more devices that are configured to generate one or more modulated optical signals; controlling the one or more devices to generate the one or more modulated optical signals; and shifting the one or more modulated optical signals to one or more base band signals that are detectable by one or more low-frequency detectors. In an example embodiment, the method for enabling detection of a modulated optical source further includes: providing at least one of the one or more devices to a person or animal. The term "providing at least one of the one or more devices to a person or animal" means that the device is part of or secured to: an object carried by, attached, or secured to a person or animal (e.g., a personal electronic device, mobile telephone, wrist watch, ring, etc.) or an article of clothing or other apparel worn by the person or animal (e.g., shirt, jacket, hat, cap, belt buckle, etc.). In an example embodiment, the one or more modulated optical signals do not include signal components that are directly detectable by the one or more low-frequency detectors prior to the shifting of the one or more modulated optical signals to one or more base band signals.

In an example silent alarm implementation, an alarm is to be "sounded" by generating an appropriate modulated optical signal (e.g., the beacon being activated in response to an input provided by a user of the device, automatically activated in response to an input pertaining to a condition, status, or triggering event, and/or remotely activated), but the fact that it is being sounded needs to be kept secret so as not to alert anyone other than those who can and should respond (i.e., those enabled to view the alarm signal. For example, the modulation rate of a light source is switched to some known frequency to indicate alarm. As an alternative to the alarm signal not being visible to the unaided eye, the signal source can be controlled in a manner causing the light to appear as though at a constant level (regardless of whether the alarm is being sounded) to avert suspicion. This could prevent panic on the part of a perpetrator, or hysteria on the part of the public, depending on the situation. It should be appreciated that the techniques described herein can be used to generate any kind of distress signal, and may be particularly useful in environments where audio or radio-frequency identification is difficult or not possible because of ambient noise and/or RF interference.

In an example indicator implementation, identification within a crowd is facilitated. For example, the user of an indicator device can set the frequency of a particular beacon to a known frequency to indicate the presence of the person wearing the beacon, or to alert others (e.g., viewer enabled members of a group) of a situation that needs attention. By way of example, the "group" may be security guards, crowd monitors, body guards, or even friends. In another example, children are provided with a high-frequency optical tag so that parents are able to identify them in a large crowd, for example. The indicator implementations described herein, and variations thereof, allow simple, unambiguous, long-distance, visual identification.

In an example law enforcement implementation, a person (e.g., an undercover agent) mingling with a group of suspected or actual criminals can be identified from afar as being a "good guy." Similar to the silent alarm example, in an example embodiment, the optical beacon can be activated by the agent (e.g., to indicate that assistance is needed). In such implementations, the beacons can be placed on mobile telephones or other wireless communication devices, for example, which are often already provided with LEDs. By way of further example, the beacons can be provided on articles of clothing, such as on the back of a shirt or coat (e.g., spelling out "POLICE" in large conspicuous print, or arranged to form some other recognizable symbol or indicia).

Figure 8:
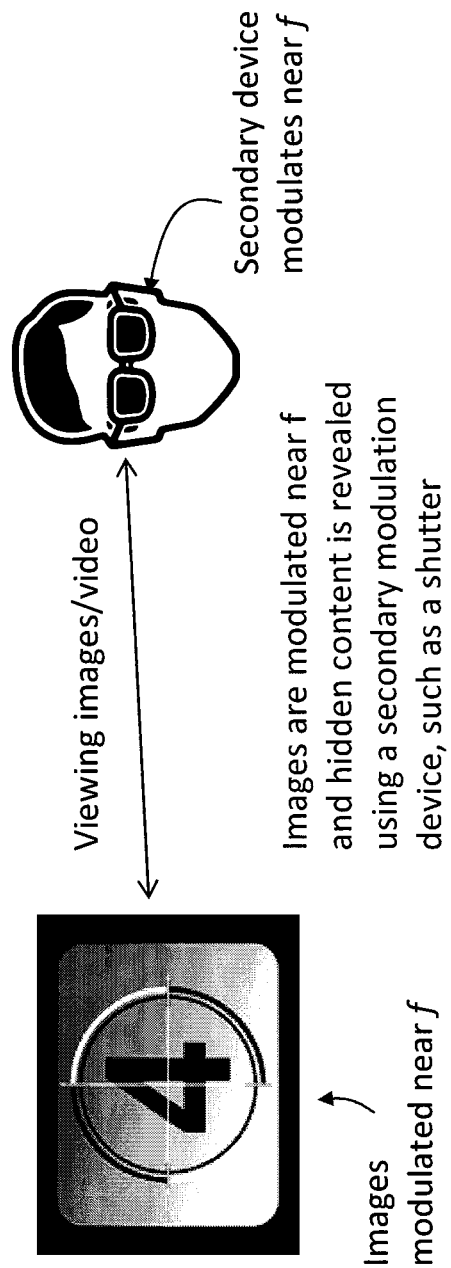
FIG. 8 illustrates an example implementation of modulated optical source detection pertaining to an entertainment/novelty device.

FIG. 8 illustrates an example implementation of modulated optical source detection pertaining to an entertainment/novelty device. By way of example, devices suitable for such implementations include, but are not limited to: image presentation devices (e.g., monitors, displays, screens) and toys or other novelty items (such as decoder rings). In an example embodiment, at least one of one or more devices generates one or more modulated optical signals containing one or more images (e.g., a sequence of images or video) that provide hidden content which is detectable by at least one of one or more low-frequency detectors. In an example embodiment, optical shutters for each eye are tuned to different frequencies allowing the person looking through the optical shutters to see visual effects. A range of different visual effects can be created using different hidden content, such as 3D visual effects.

Figure 9:
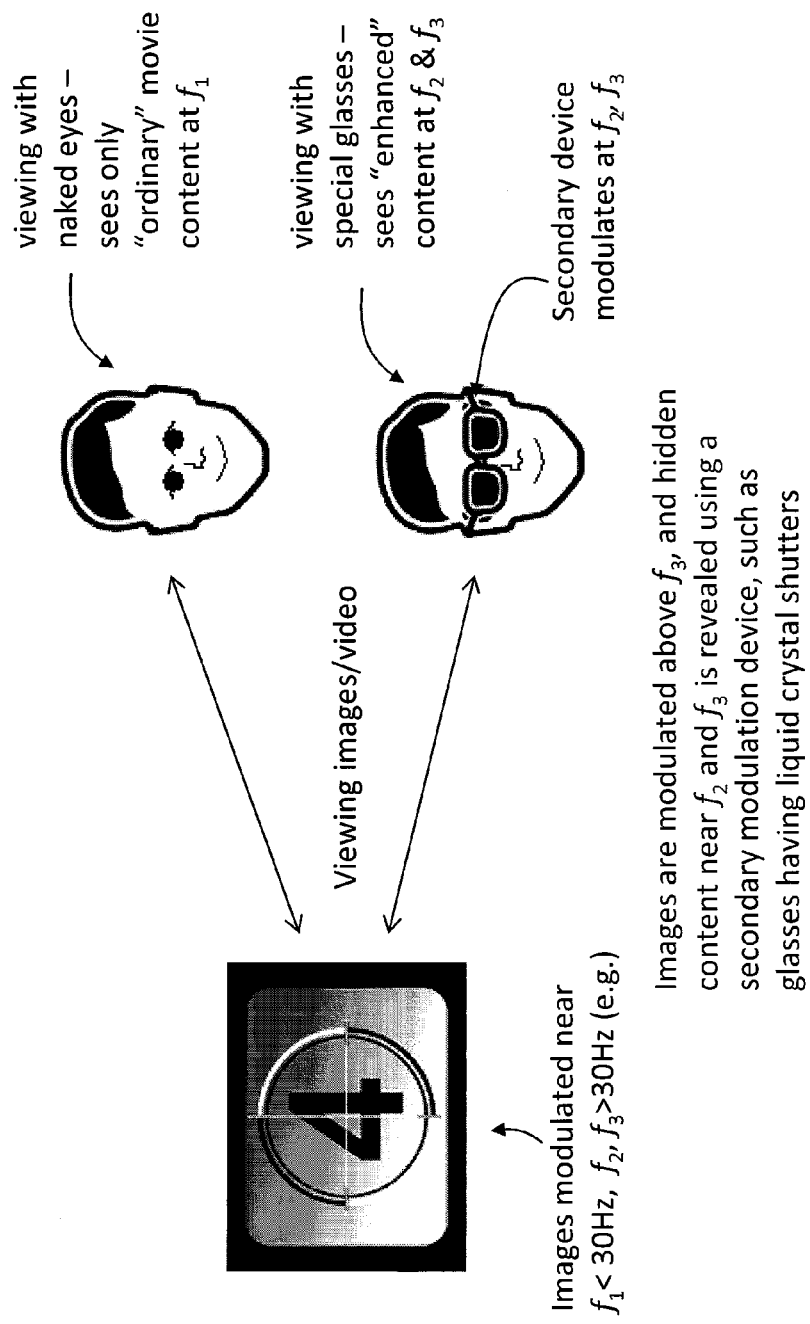
FIG. 9 illustrates an example implementation of modulated optical source detection pertaining to a device for enhanced video.

FIG. 9 illustrates an example implementation of modulated optical source detection pertaining to a device for enhanced video. In the illustrated example, different hidden content is modulated at different frequencies, both of which are not detectable by a low-frequency detector such as the unaided eye. By way of example, a device (such as a projector or television) is configured to generate "ordinary" movie content at $f_1$ (e.g., $f_1$<30 Hz) and hidden content at $f_2$, $f_3$ (e.g., $f_2$, $f_3$>30 Hz). The "ordinary" movie content can be viewed with the naked eye. The hidden or "enhanced" content at $f_2$ and $f_3$ is revealed using a secondary modulation device, such as glasses having liquid crystal shutters. For example, hidden content or information is provided at 60 fps and 90 fps and glasses are provided with a first optical shutter for the right eye that is modulated near 60 fps and a second optical shutter for the left eye that is modulated near 90 fps. In an example embodiment, the viewer equipped with the afore-described glasses can still see the sub-30 fps information, and can also see the 60 fps and 90 fps content or information. By way of example, the hidden content or information can include, but is not limited to: extra information, such as subtitles; and images that provide 3D visual effects.

In an example embodiment, a secondary modulator device is configured to selectively enable viewing of the hidden content at $f_2$ or the hidden content at $f_3$. For example, French subtitles are at 60 fps, and German subtitles at 90 fps, and only people with 60 Hz hidden content enabled glasses can see the French subtitles, and only people with 90 Hz hidden content enabled glasses can see the German subtitles. In another example embodiment, the shutter glasses or other viewing apparatus is configured to permit the user to select which hidden content they will view, or to disable viewing of hidden content. In another example embodiment, the shutter glasses or other viewing apparatus is controlled (e.g., remotely) by someone other than the wearer of the glasses.

In an example embodiment, one or more modulated optical signals include a plurality of modulated optical signals, and at least one of one or more secondary modulators is configurable to facilitate selective viewing of different modulated optical signals among the plurality of modulated optical signals. In an example embodiment, the one or more modulated optical signals includes two or more modulated optical signals modulated and shifted such that one of the two or more modulated optical signals is detectable by at least one of one or more low-frequency detectors and such that a different one of the two or more modulated optical signals is detectable by a different at least one of the one or more low-frequency detectors. In an example embodiment, the two or more modulated optical signals are modulated at different modulation frequencies. In an example embodiment, the two or more modulated optical signals are shifted using different secondary modulation frequencies. In an example embodiment, the two or more modulated optical signals include different content.

Figure 10:
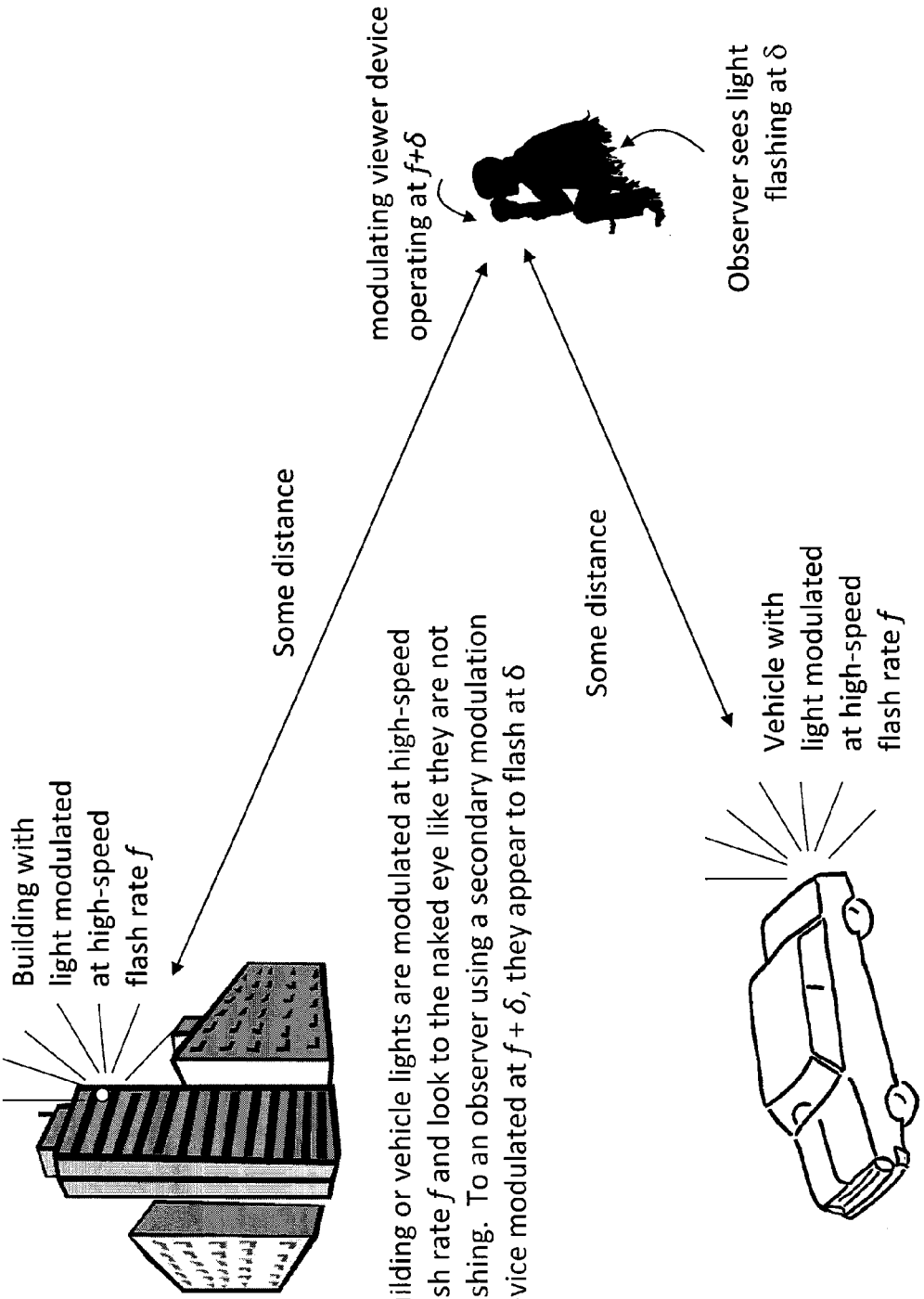
FIG. 10 illustrates an example implementation of modulated optical source detection pertaining to remote tagging/identification/signaling of/from a building or vehicle.

FIG. 10 illustrates an example implementation of modulated optical source detection pertaining to remote tagging/identification/signaling of/from a building or vehicle. As discussed above, it may be useful in some circumstances to position the signal source on a building or on some other object that has a clear LOS to the low-frequency detector, even if the remainder of the device is remotely located with respect to the signal source. In other example embodiments, the entire device is secured to a building or other objects. In other example embodiments, multiple devices are secured to buildings and/or other objects.

In an example law enforcement implementation, a vehicle (motorized or otherwise) is equipped with a device configured to generate one or more modulated optical signals as described herein. In an example embodiment, the signal source (e.g., a LED) is controlled to oscillate at a rate corresponding to the velocity of the vehicle. For example, the measurements of a motion sensor (e.g., part of the device), or velocity data provided by the vehicle itself, are provided to the device controller. The interests of vehicle speed monitoring and speed limit enforcement may be furthered by technology that eliminates or lessens the need for expensive and inexact police radar devices. Conventional police radar devices typically employ a wide beam that prevents precise identification of the velocities of different vehicles within a cluster. A modulated optical signal that does not appear to be flashing to a low-frequency detector can be utilized as previously described herein to remove all uncertainty as to which vehicle was traveling at which speed.

Although the present invention has been described in terms of the example embodiments above, numerous modifications and/or additions to the above-described embodiments would be readily apparent to one skilled in the art. It is intended that the scope of the present invention extend to all such modifications and/or additions.

What is claimed is:

1. A method for enabling detection of a modulated optical source, the method comprising:
   providing one or more devices that are configured to generate one or more modulated optical signals;
   controlling the one or more devices to generate the one or more modulated optical signals; and
   shifting the one or more modulated optical signals to one or more base band signals that are detectable by one or more low-frequency detectors;
   wherein shifting at least one of the one or more modulated optical signals comprises generating one or more aliased signals by modulating said at least one of the one or more modulated optical signals at a frequency near the operating frequency of said modulated optical signal.

2. The method of claim 1, wherein the one or more modulated optical signals do not include signal components that are directly detectable by the one or more low-frequency detectors prior to the shifting of the one or more modulated optical signals to one or more base band signals.

3. The method of claim 1, wherein the shifting of the one or more modulated optical signals to one or more base band signals does not include using a mixer or a low-pass filter to demodulate the one or more modulated optical signals.

4. The method of claim 1, wherein at least one of the one or more devices is configured to generate a frequency modulated optical signal.

5. method of claim 1, wherein at least one of the one or more devices includes a light source which is controlled to generate at least one of the one or more modulated optical signals.

6. The method of claim 5, wherein the light source is a light emitting diode (LED).

7. The method of claim 1, wherein at least one of the one or more devices is a safety light.

8. The method of claim 1, wherein at least one of the one or more devices is a runway safety light.

9. The method of claim 1, wherein at least one of the one or more devices is a personal electronic device.

10. The method of claim 1, wherein at least one of the one or more devices is a silent alarm.

11. The method of claim 1, wherein at least one of the one or more devices generates one or more modulated optical signals containing one or more images.

12. The method of claim 11, wherein the one or more images provide hidden content which is detectable by at least one of the one or more low-frequency detectors.

13. The method of claim 1, further comprising:
   providing at least one of the one or more devices to a person or animal.

14. The method of claim 1, further comprising:
   securing at least one of the one or more devices to an object.

15. The method of claim 14, wherein the object is a motorized vehicle.

16. The method of claim 14, wherein the object is a building.

17. The method of claim 1, wherein at least one of the one or more devices is controlled to generate a modulated optical signal in response to an input pertaining to a condition, status, or triggering event.

18. The method of claim 1, wherein shifting at least one of the one or more modulated optical signals to one or more base band signals comprises creating one or more sampling artifacts.

19. The method of claim 1, wherein at least one of the one or more devices is a mobile telephone.

20. The method of claim 1, wherein shifting at least one of the one or more modulated optical signals to one or more base band signals comprises viewing at least one of the one or more modulated optical signals through one or more secondary modulators.

21. The method of claim 20, wherein at least one of the one or more modulated optical signals is modulated at a modulation frequency, and at least one of the one or more secondary modulators modulates at a secondary modulation frequency near the modulation frequency.

22. The method of claim 20, wherein at least one of the one or more secondary modulators includes a shutter.

23. The method of claim 20, wherein at least one of the one or more secondary modulators includes a mechanical shutter.

24. The method of claim 20, wherein at least one of the one or more secondary modulators includes a liquid crystal shutter, electro-chromic glass, or photo-chromic glass.

25. The method of claim 20, wherein at least one of the one or more secondary modulators includes a chopper.

26. The method of claim 20, wherein at least one of the one or more secondary modulators includes a chopper wheel.

27. The method of claim 20, wherein at least one of the one or more secondary modulators includes a polarizer.

28. The method of claim 20, wherein at least one of the one or more secondary modulators includes a rotating polarizer.

29. The method of claim 20, wherein at least one of the one or more secondary modulators includes a polarization rotator and an analyzer.

30. The method of claim 20, wherein the one or more modulated optical signals include a plurality of modulated optical signals, and at least one of the one or more secondary modulators is configurable to facilitate selective viewing of different modulated optical signals among the plurality of modulated optical signals.

31. The method of claim 1, wherein at least one of the one or more low-frequency detectors is the human eye.

32. The method of claim 1, wherein at least one of the one or more low-frequency detectors is a camera.

33. The method of claim 1, wherein at least one of the one or more low-frequency detectors has a cut-off frequency of approximately 25 Hz.

34. The method of claim 1, wherein at least one of the one or more low-frequency detectors has a cut-off frequency of approximately 40 Hz.

35. The method of claim 1, wherein the one or more modulated optical signals includes two or more modulated signals modulated at a modulation frequency and shifted using a secondary modulation frequency such that only a subset of the two or more modulated optical signals is detectable by at least one of the one or more low-frequency detectors.

36. The method of claim 1, wherein the one or more modulated optical signals includes two or more modulated optical signals modulated and shifted such that one of the two or more modulated optical signals is detectable by at least one of the one or more low-frequency detectors and such that a different one of the two or more modulated optical signals is detectable by a different at least one of the one or more low-frequency detectors.

37. The method of claim 36, wherein the two or more modulated optical signals are modulated at different modulation frequencies.

38. The method of claim 36, wherein the two or more modulated optical signals are shifted using different secondary modulation frequencies.

39. The method of claim 36, wherein the two or more modulated optical signals include different content.

40. The method of claim 1, wherein the one or more low-frequency detectors include two or more low-frequency detectors each provided with an optical shutter device through which the one or more modulated optical signals is viewed, and at least one of the one or more modulated optical signals is not detectable by at least one of the two or more low-frequency detectors.

41. The method of claim 1, wherein the one or more low-frequency detectors include two or more low-frequency detectors each provided with an optical shutter device through which the one or more modulated optical signals is viewed, and the one or more modulated optical signals include two or more modulated optical signals modulated and shifted such that at least one of the two or more modulated optical signals is not detectable by at least one of the two or more low-frequency detectors.

42. A method for enabling detection of a modulated optical source, the method comprising:
shifting one or more modulated optical signals to one or more base band signals that are detectable by one or more low-frequency detectors;
wherein shifting at least one of the one or more modulated optical signals to one or more base band signals comprises generating one or more aliased signals by modulating said at least one of the one or more modulated optical signals at a frequency near the operating frequency of said modulated optical signal.

43. The method of claim 42, wherein the one or more modulated optical signals do not include signal components that are directly detectable by the one or more low-frequency detectors prior to the shifting of the one or more modulated optical signals to one or more base band signals.

44. The method of claim 42, wherein the shifting of the one or more modulated optical signals to one or more base band signals does not include using a mixer or a low-pass filter to demodulate the one or more modulated optical signals.

45. The method of claim 42, wherein shifting at least one of the one or more modulated optical signals to one or more base band signals comprises creating one or more sampling artifacts.

46. The method of claim 42, wherein shifting at least one of the one or more modulated optical signals to one or more base band signals comprises viewing at least one of the one or more modulated optical signals through one or more secondary modulators.

47. The method of claim 46, wherein at least one of the one or more modulated optical signals is modulated at a modulation frequency, and at least one of the one or more secondary modulators modulates at a secondary modulation frequency near the modulation frequency.

48. The method of claim 46, wherein at least one of the one or more secondary modulators includes a shutter.

49. The method of claim 46, wherein at least one of the one or more secondary modulators includes a mechanical shutter.

50. The method of claim 46, wherein at least one of the one or more secondary modulators includes a liquid crystal shutter, electro-chromic glass, or photo-chromic glass.

51. The method of claim 46, wherein at least one of the one or more secondary modulators includes a chopper.

52. The method of claim 46, wherein at least one of the one or more secondary modulators includes a chopper wheel.

53. The method of claim 46, wherein at least one of the one or more secondary modulators includes a polarizer.

54. The method of claim 46, wherein at least one of the one or more secondary modulators includes a rotating polarizer.

55. The method of claim 46, wherein at least one of the one or more secondary modulators includes a polarization rotator and an analyzer.

56. The method of claim 42, wherein the one or more modulated optical signals include a plurality of modulated optical signals, and at least one of the one or more secondary modulators is configurable to facilitate selective viewing of different modulated optical signals among the plurality of modulated optical signals.

57. The method of claim 42, wherein the one or more low-frequency detectors include two or more low-frequency detectors each provided with an optical shutter device through which the one or more modulated optical signals is viewed, and at least one of the one or more modulated optical signals is not detectable by at least one of the two or more low-frequency detectors.

58. The method of claim 42, wherein the one or more low-frequency detectors include two or more low-frequency detectors each provided with an optical shutter device through which the one or more modulated optical signals is viewed, and the one or more modulated optical signals include two or more modulated optical signals modulated and shifted such that at least one of the two or more modulated optical signals is not detectable by at least one of the two or more low-frequency detectors.

59. The method of claim 42, further comprising:
generating the one or more modulated optical signals.

60. The method of claim 42, wherein at least one of the one or more modulated optical signals is a frequency modulated optical signal.

61. The method of claim 42, wherein at least one of the one or more modulated optical signals contains one or more images.

62. The method of claim 61, wherein the one or more images provide hidden content which is detectable by at least one of the one or more low-frequency detectors.

63. The method of claim 42, wherein at least one of the one or more modulated optical signals is generated in response to an input pertaining to a condition, status, or triggering event.

64. The method of claim 42, wherein the one or more modulated optical signals includes two or more modulated signals modulated at a modulation frequency and shifted using a secondary modulation frequency such that only a subset of the two or more modulated optical signals is detectable by at least one of the one or more low-frequency detectors.

65. The method of claim 42, wherein the one or more modulated optical signals includes two or more modulated optical signals modulated and shifted such that one of the two or more modulated optical signals is detectable by at least one of the one or more low-frequency detectors and such that a different one of the two or more modulated optical signals is detectable by a different at least one of the one or more low-frequency detectors.

66. The method of claim 65, wherein the two or more modulated optical signals are modulated at different modulation frequencies.

67. The method of claim 65, wherein the two or more modulated optical signals are shifted using different secondary modulation frequencies.

68. The method of claim 65, wherein the two or more modulated optical signals include different content.

69. An apparatus for enabling detection of a modulated optical source, the apparatus comprising:

one or more optical demodulators configured to shift one or more modulated optical signals to one or more base band signals that are detectable by one or more low-frequency detectors;
wherein at least one of the optical demodulators is configured to shift one or more modulated optical signals to one or more base band signals by generating one or more aliased signals by modulating said one or more modulated optical signals at a frequency near an operating frequency of said one or more modulated optical signals.

70. The apparatus of claim 69, wherein the one or more modulated optical signals do not include signal components that are directly detectable by the one or more low-frequency detectors prior to the one or more modulated optical signals being shifted to one or more base band signals.

71. The apparatus of claim 69, wherein the one or more optical demodulators do not include a mixer or a low-pass filter for demodulating the one or more modulated optical signals.

72. The apparatus of claim 69, wherein at least one of the optical demodulators is configured to shift one or more modulated optical signals to one or more base band signals by creating one or more sampling artifacts.

73. The apparatus of claim 69, wherein the one or more optical demodulators includes one or more secondary modulators through which at least one of the one or more modulated optical signals is viewed.

74. The apparatus of claim 73, wherein at least one of the one or more modulated optical signals is modulated at a modulation frequency, and at least one of the one or more secondary modulators modulates at a secondary modulation frequency near the modulation frequency.

75. The apparatus of claim 73, wherein at least one of the one or more secondary modulators includes a shutter.

76. The apparatus of claim 73, wherein at least one of the one or more secondary modulators includes a mechanical shutter.

77. The apparatus of claim 73, wherein at least one of the one or more secondary modulators includes a liquid crystal shutter, electro-chromic glass, or photo-chromic glass.

78. The apparatus of claim 73, wherein at least one of the one or more secondary modulators includes a chopper.

79. The apparatus of claim 73, wherein at least one of the one or more secondary modulators includes a chopper wheel.

80. The apparatus of claim 73, wherein at least one of the one or more secondary modulators includes a polarizer.

81. The apparatus of claim 73, wherein at least one of the one or more secondary modulators includes a rotating polarizer.

82. The apparatus of claim 73, wherein at least one of the one or more secondary modulators includes a polarization rotator and an analyzer.

83. The apparatus of claim 73, wherein the one or more modulated optical signals include a plurality of modulated optical signals, and at least one of the one or more secondary modulators is configurable to facilitate selective viewing of different modulated optical signals among the plurality of modulated optical signals.

84. The apparatus of claim 69, wherein the one or more low-frequency detectors include two or more low-frequency detectors, and at least one of the one or more modulated optical signals shifted by the one or more optical demodulators is not detectable by at least one of the two or more low-frequency detectors.

85. The apparatus of claim 69, wherein the one or more low-frequency detectors include two or more low-frequency detectors, the one or more modulated optical signals include two or more modulated optical signals, and at least one of the two or more modulated optical signals shifted by the one or more optical demodulators is not detectable by at least one of the two or more low-frequency detectors.

86. The apparatus of claim 69, further comprising:
one or more devices configured to generate the one or more modulated optical signals.

87. The apparatus of claim 86, wherein at least one of the one or more devices is a mobile telephone.

88. The apparatus of claim 86, wherein at least one of the one or more devices includes a light source which is controlled to generate at least one of the one or more modulated optical signals.

89. The apparatus of claim 88, wherein the light source is a light emitting diode (LED).

90. The apparatus of claim 86, wherein at least one of the one or more devices is a safety light.

91. The apparatus of claim 86, wherein at least one of the one or more devices is a runway safety light.

92. The apparatus of claim 86, wherein at least one of the one or more devices is a personal electronic device.

93. The apparatus of claim 86, wherein at least one of the one or more devices is a silent alarm.

94. The apparatus of claim 86, wherein at least one of the one or more devices generates one or more modulated optical signals containing one or more images.

95. The apparatus of claim 94, wherein the one or more images provide hidden content which is detectable by at least one of the one or more low-frequency detectors.

96. The apparatus of claim 86, wherein at least one of the one or more devices includes a controller programmed to generate a modulated optical signal in response to an input pertaining to a condition, status, or triggering event.

97. The apparatus of claim 86, wherein the one or more modulated optical signals includes two or more modulated signals modulated at a modulation frequency and shifted using a secondary modulation frequency such that only a subset of the two or more modulated optical signals is detectable by at least one of the one or more low-frequency detectors.

98. The apparatus of claim 86, wherein the one or more modulated optical signals includes two or more modulated optical signals modulated and shifted such that one of the two or more modulated optical signals is detectable by at least one of the one or more low-frequency detectors and such that a different one of the two or more modulated optical signals is detectable by a different at least one of the one or more low-frequency detectors.

99. The apparatus of claim 98, wherein the two or more modulated optical signals are modulated at different modulation frequencies.

100. The apparatus of claim 98, wherein the two or more modulated optical signals are shifted using different secondary modulation frequencies.

101. The apparatus of claim 98, wherein the two or more modulated optical signals include different content.

102. The apparatus of claim 86, wherein at least one of the one or more devices is configured to generate a frequency modulated optical signal.

103. The apparatus of claim 69, further comprising:
one or more low-frequency detectors.

* * * * *